US00RE45457E

(19) United States
(12) Reissued Patent
Woodbridge

(10) Patent Number: US RE45,457 E
(45) Date of Reissued Patent: Apr. 7, 2015

(54) MEMORY REUSE FOR MULTIPLE ENDPOINTS IN USB DEVICE

(75) Inventor: Nancy G. Woodbridge, Austin, TX (US)

(73) Assignee: Micron Technology, Inc., Boise, ID (US)

(21) Appl. No.: 13/277,963

(22) Filed: Oct. 20, 2011

Related U.S. Patent Documents

Reissue of:
(64) Patent No.: 7,606,951
Issued: Oct. 20, 2009
Appl. No.: 10/988,417
Filed: Nov. 12, 2004

(51) Int. Cl.
*G06F 3/00* (2006.01)
*G06F 13/12* (2006.01)
*G06F 13/38* (2006.01)

(52) U.S. Cl.
CPC ..... *G06F 13/385* (2013.01); *G06F 2213/00* (2013.01)

(58) Field of Classification Search
CPC ..... G06F 2213/0042; G06F 13/385
USPC ..... 710/36
See application file for complete search history.

(56) References Cited

U.S. PATENT DOCUMENTS

| | | | | |
|---|---|---|---|---|
| 5,835,435 | A | 11/1998 | Bogin et al. | |
| 6,119,195 | A | 9/2000 | Ellis et al. | |
| 6,141,283 | A | 10/2000 | Bogin et al. | |
| 6,219,736 | B1 * | 4/2001 | Klingman | 710/315 |
| 6,519,290 | B1 | 2/2003 | Green | |
| 6,523,081 | B1 * | 2/2003 | Karlsson et al. | 710/305 |
| 6,549,958 | B1 | 4/2003 | Kuba | |
| 6,732,218 | B2 | 5/2004 | Overtoom et al. | |
| 6,742,097 | B2 | 5/2004 | Woo et al. | |
| 6,795,872 | B2 * | 9/2004 | Page et al. | 710/8 |
| 6,820,166 | B2 | 11/2004 | Kitagawa | |
| 6,907,492 | B2 | 6/2005 | Matsuda et al. | |
| 6,912,651 | B1 | 6/2005 | Hamdi et al. | |
| 6,993,618 | B2 | 1/2006 | Chen et al. | |
| 7,000,057 | B1 | 2/2006 | Novell et al. | |
| 7,024,501 | B1 | 4/2006 | Wright | |
| 7,028,109 | B2 | 4/2006 | Saito et al. | |
| 7,028,111 | B2 | 4/2006 | Chang et al. | |
| 7,028,200 | B2 | 4/2006 | Ma | |
| 7,073,010 | B2 * | 7/2006 | Chen et al. | 710/313 |
| 7,165,165 | B2 | 1/2007 | Woodbridge et al. | |

(Continued)

FOREIGN PATENT DOCUMENTS

| | | |
|---|---|---|
| JP | 2002-116853 A | 1/2002 |
| JP | 2002116853 | 4/2002 |

OTHER PUBLICATIONS

Woodbridge et al., US Patent Application, Anticipatory Power Control of Memory, Filed on Mar. 16, 2004, Serial No. 802,420.

(Continued)

*Primary Examiner* — Titus Wong
(74) *Attorney, Agent, or Firm* — Greenberg Traurig LLP

(57) ABSTRACT

In a system in which individual memory banks may be under individual power control, a subsequent need for a memory bank that is currently in a low power state may be anticipated, so that the memory bank may be powered up in advance of when it is needed, to reduce or eliminate delays caused by waiting for the memory bank to power up and become operational. The anticipation may be based on accessing a predetermined location in another memory bank.

30 Claims, 2 Drawing Sheets

(56) References Cited

U.S. PATENT DOCUMENTS

| | | | | |
|---|---|---|---|---|
| 2003/0061431 | A1 | 3/2003 | Mears et al. | |
| 2004/0030742 | A1 | 2/2004 | Kitagawa | |
| 2004/0186926 | A1 | 9/2004 | Rapaich | |
| 2005/0044286 | A1 * | 2/2005 | Lim et al. | 710/15 |
| 2005/0091437 | A1 | 4/2005 | Yang et al. | |
| 2005/0249143 | A1 | 11/2005 | Tee et al. | |
| 2006/0059289 | A1 | 3/2006 | Ng et al. | |
| 2006/0106962 | A1 | 5/2006 | Woodbridge | |

OTHER PUBLICATIONS

Universal Bus Specification, 2000, Compaq, Hewlett Packard, Intel Corp., Lucent Technologies, Microsoft Corp., NEC Corp., Koninklijke Philips Electronics.

Woodbridge et al., US Patent Application, "USB On-The-Go Implementation", filed on Nov. 17, 2004, U.S. Appl. No. 10/992,250.

Mueller et al., U.S. Patent Application, "Method for Supporting Multiple Devices on a High Speed Physical Link", filed Dec. 31, 2003, Serial No. (P18089) filed by Troutman Sanders LLP, pp. 17 total.

On-The-Go Supplement to the USB 2.0 Specification, Revision 1.0a, Jun. 2003, 2003 USB Implementers Forum, Inc., pp. 77 total.

USB On-The-Go IP Core, May 17, 2003, ASICSws Product Overview, pp. 2 total.

Understanding USB On-The-Go designfeature, Nov. 22, 2001, pp. 3 total.

USB OTG peripheral/controller does it in one IC Transdimensions Inc, Oct. 28, 2004, pp. 1 total.

TD243 Three Port, Single Chip USB On-The-Go Host/Peripheral Controller, Mar. 19, 2004, pp. 1-14 Product Brief.

USB On-The-Go presents benefits, challenges to power designers, EETIMES, D&R Industry Articles May 2, 2003, pp. 4 total.

On-The-Go Supplement to the USB 2.0 Specification, Revision 1.0, Dec. 18, 2001.

Interfacing TD243 USB Host/Peripheral/OTG Controller to Intel StrongARM SA 1110, Transdimension, Rev. 2.0, Dec. 2003, pp. 19 total.

* cited by examiner

MEMORY REUSE FOR MULTIPLE ENDPOINTS IN USB DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a reissue application of U.S. Pat. No. 7,606,951, granted from U.S. patent application Ser. No. 10/988,417, filed Nov. 12, 2004.*

TECHNICAL FIELD

The inventions generally relate to allocating and controlling the configuration of USB endpoint memory.

BACKGROUND

Serial buses are now used to interface peripheral devices to a computer system. Examples of these buses include the Universal Serial Bus (USB) and the Institute of Electrical and Electronic Engineers (IEEE) 1394 standard bus. These serial buses provide a simple method of attaching and accessing peripheral devices.

For example, the USB is a new standard that complements the traditional interfaces via the microprocessor bus such as the Peripheral Component Interconnect (PCI), Industry Standard Architecture (ISA), or Enhanced Industry Standard Architecture (EISA) buses. Advantages of the USB include plug and play support, hot attachment, expandability, legacy hardware and software support, and low cost.

A USB-based system typically includes one or more USB clients (USB clients are also referred to interchangeably as "USB devices", "USB client devices", etc.), a USB host controller, and one or more hubs. Examples of USB devices are USB-compatible digital cameras, printers, keyboards, scanners, modems, and digital phones. All USB devices attach directly to a USB host (or host controller) or via a USB hub that provides one or more ports. Original USB (USB 1.1) supports two different speeds: 1.5 megabits (Mbits) per second (Mbps) for low-speed devices and 12 MBits/second (Mbps) for high-speed devices. USB 2.0 (Hi-Speed USB) supports a speed of 480 Mbps.

USB makes plugging in new peripherals easy with plug and play, is much faster (approximately 100 times faster) than the original serial port, and supports multiple device connectivity. Because of these benefits, USB is enjoying broad market acceptance. USB allows expandability of the capabilities of a computer via an external port, eliminating the need for users or integrators to open the system chassis. Since USB supports multiple peripheral devices simultaneously, it allows users to run numerous devices such as printers, scanners, digital cameras and speakers from a single computer (for example, a PC). USB also allows for automatic device detection and installation, making connectivity a true plug-and-play experience for end users. Virtually every PC today has one or more USB ports, quickly moving the installed base of USB-capable PCs to the range of hundreds of millions.

The term "endpoint" refers to the logical measure of a port. Each USB device has a certain number of endpoints. If there is a need to send a certain type of data, an endpoint is allocated. If data is to be sent at other speeds then another endpoint is allocated. In this manner, one or more logical connections are made between a USB host, which may be located, for example, on a motherboard of a PC, and a USB client.

USB typically uses 15 programmable endpoints and one non-programmable endpoint, and uses one configuration at a time. In current USB client controllers each endpoint is allocated a fixed, exclusive memory block for storage of endpoint data. In this manner, the number of bytes of memory needed in the limited amount of endpoint memory is the maximum packet size of each endpoint, and is two times the maximum packet size of each endpoint if the endpoints are double-buffered. In some implementations the maximum packet size of the endpoints may be limited in an effort to reduce the size of the required memory. However, since USB protocol requires that the endpoints in the current configuration, the current interface(s), and the current selected alternate interface(s) being used by the host controller may be accessed, the portion of endpoint memory that is not assigned to endpoints in the current configuration is not used.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
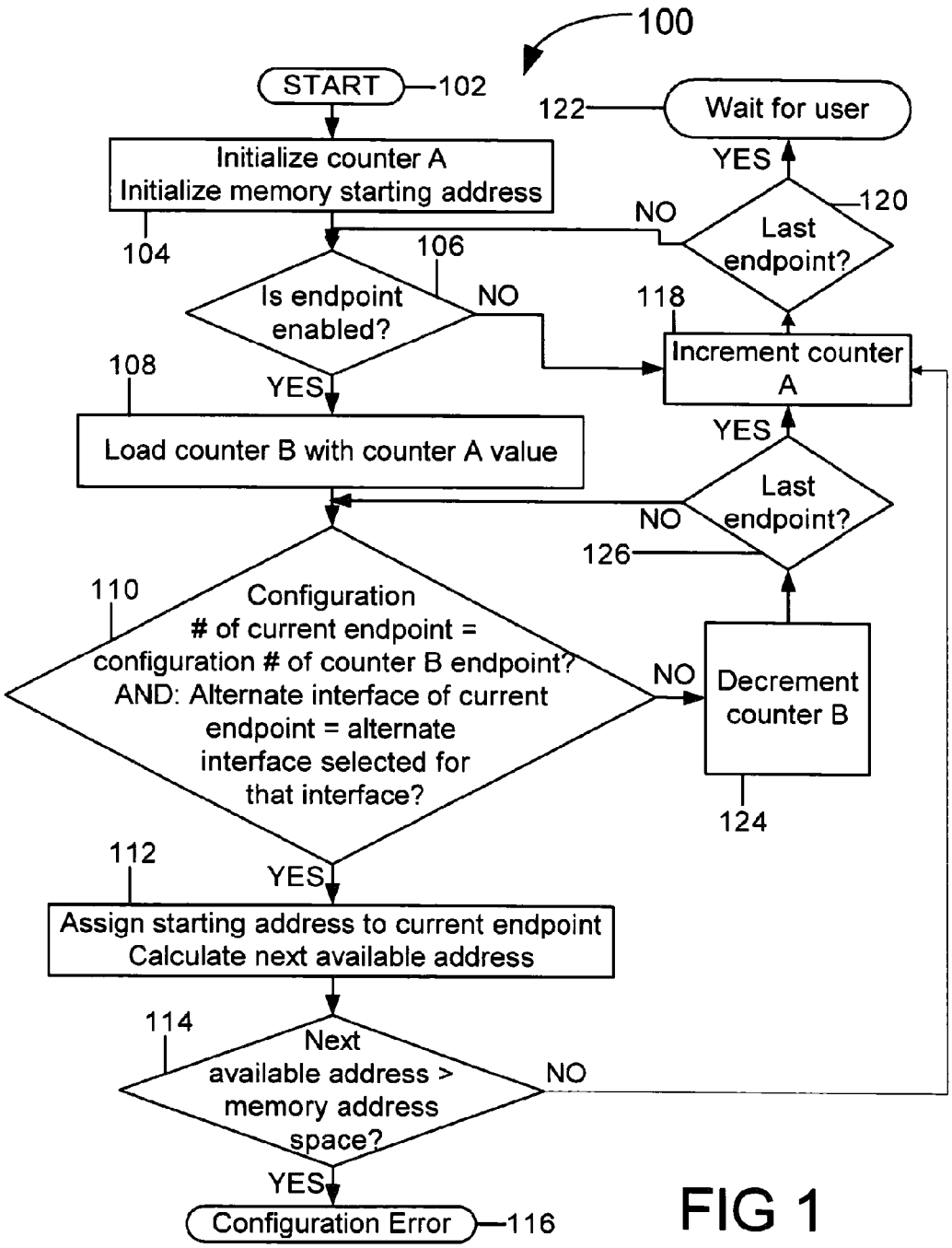
FIG. 1 is a flow diagram illustrating a USB endpoint memory allocation and control implementation according to some embodiments of the inventions.

Some embodiments of the inventions relate to allocating and controlling the configuration of USB device endpoint memory. Some embodiments relate to reusing memory for multiple endpoints in a USB device with multiple configurations, interfaces and/or alternate interfaces.

For example, in some embodiments, each endpoint might have 3 configurations and 8 interfaces, with each interface having 8 alternate settings. A configuration (or sometimes referred to as "a current configuration") can typically include an interface for the transfer of video data, an interface for the transfer of still camera data, an interface for the transfer of audio data, and an interface for the transfer of user control information, for example. Each interface may have several alternate interfaces with each alternate interface using more than one endpoint. Specific examples of current configurations can include: a device running off battery power (a first configuration), AC power (a second configuration), or connected to a PC either alone or in conjunction with AC power (a third configuration). Specific examples of current interfaces can include: a device playing streaming video (a first interface), a device taking still pictures and transferring the data back to the PC for display or print (a second interface), a device storing phone number and address information in device memory (a third interface), or a device printing data to a printer (a fourth interface). Specific examples of alternate interfaces are: a device capable of displaying streaming video at 60 frames per second (a first alternate interface), 30 frames per second (a second alternate interface) or 10 frames per second (a third alternate interface).

In some embodiments, for example, a mouse might have two logical endpoints. These two logical endpoints might include a control configuration of the mouse and a push button. The control configuration might include, for example, a two button configuration, a 3 button configuration, or a 3 button plus a roller configuration, while the push button endpoint might be an interrupt mechanism, for example. A mouse doesn't typically need multiple configurations or endpoints, however.

In some embodiments, a cell phone might be used, for example, to download audio or video data, or to play audio or video. A particular USB host connection might currently have enough bandwidth to service all of these functions, but there might not be enough memory at the device controller in the cell phone device to store all of the required endpoint data. In another host connection, the host may not have the bandwidth available to send all of the requested data, so a different configuration might be needed that uses less bandwidth, or a USB device controller might be needed that has significantly more memory. However, increasing the size of memory will increase the cost of the USB devices.

In some embodiments a USB device is a cell phone. For example, the cell phone might have three different configurations, including the cell phone running off battery power, the cell phone hooked up to an AC power source, and the cell phone connected to auxiliary battery power. In the first exemplary configuration the cell phone is running off battery power and is hooked up to a host (such as a personal computer) to transfer data between the host and the cell phone. The cell phone informs the host that the cell phone is running off battery power so the host will select a low power configuration with limited bandwidth, power and endpoints. This might include two or three active endpoints that are each low bandwidth. In the second exemplary configuration in which the cell phone is hooked up to AC power (for example, plugged in to an AC wall outlet) there is no power concern so there is no need to operate in a low power mode. For example, streaming video could be continuously downloaded to the cell phone at high bandwidths since there are no power concerns. All of the endpoint memory can be used and many endpoints enabled. In some embodiments, if the cell phone is hooked up to an AC power source and in the second configuration and the power source to the cell phone is unplugged, the cell phone informs the host which selects a new configuration, reallocation of the endpoint memory may be performed for a new set of endpoints (for example, in a new configuration such as the first configuration described above). In the third exemplary configuration the cell phone is connected to a more powerful auxiliary battery and connected to a host such as a personal computer, but the host has many other USB devices attached to it at the same time (for example, a printer, a monitor, a mouse, a digital camera, a video camera, speakers, etc.) In such an implementation the host may want to limit the bandwidth with the cell phone due to a restriction at the host because of the large number of connected devices. Such an implementation might have plenty of power but less bandwidth. Each of the configurations, bandwidth, endpoints, etc. may be selectable by a user, either at the host end (for example, on a PC) or at the client end (for example, on a cell phone, digital camera, printer, monitor, mouse, video camera, speakers, etc.) In some embodiments if several high bandwidth clients are connected at the same time (for example, a video camera, a digital camera and USB speakers) the host (for example, a PC) might tell the user that it can not allocate any more bandwidth or service more than one or two or some number of devices at the same time and ask the user to select which device (or devices) is (are) to be used.

In some embodiments the allocation and control of the configuration of a USB device memory that is used to store endpoint data is implemented in a manner such that the memory space is reused by multiple endpoints. The reuse of the endpoint memory space of a USB device allows the size of the memory array required to support multiple endpoints to be reduced.

In some embodiments, each time a new configuration, interface and/or alternate interface is activated by a host controller, the same memory may be reallocated. In some embodiments this may be implemented through user control.

In some embodiments the same memory is reallocated each time a new configuration, interface or alternate interface is activated. In some embodiments the same memory is reallocated each time a new configuration, interface or alternate interface is activated by a host controller. In some embodiments the host controller is a USB host controller. In some embodiments the reallocation occurs in a device controller (for example, a USB device controller). In some embodiments the reallocation occurs in a host (for example, implemented on the motherboard of a host). In some embodiments the reallocation occurs in the host controller (for example, a USB host controller). In some embodiments the reallocation occurs in a client device (for example, a USB client device). In some embodiments the memory is resident within a client device (for example, a USB client device).

In some embodiments a memory map is calculated for each configuration, interface and/or alternate interface setting that has an active endpoint. The configuration, interface and/or alternative interface activated by the USB host controller is then monitored. When a change occurs a user is notified and, when enabled by a user input, the memory is allocated based on the calculated memory map for that selection. In some embodiments, when a change occurs, the memory may be allocated based on the calculated memory map for that selection without user notification and/or without requiring enablement by a user input.

According to some embodiments, by reallocating the memory to store data only for the endpoints that are active for the current configuration, interface and/or alternate interface selected by the USB host controller, the endpoints that are not active are not requiring the use of any of the memory space. Thus, a smaller memory array may be used to support the same number of endpoints.

In some embodiments a USB endpoint memory map is calculated for a plurality of active endpoints, a change to a configuration, an interface, and/or an alternate interface is monitored, and endpoint data is allocated in a USB endpoint memory in response to the monitoring and the calculating.

In some embodiments a USB device includes a USB endpoint memory and a device controller. The device controller is to calculate a USB endpoint memory map for a plurality of active endpoints, to monitor a change to a configuration, an interface, and/or an alternate interface, and to allocate endpoint data space in the USB endpoint memory in response to the change and to the USB endpoint memory maps.

In some embodiments a system includes a USB host device, a USB client device including a USB endpoint memory, and a device controller to calculate a USB endpoint memory map for a plurality of active endpoints, to monitor a change to a configuration, an interface, and/or an alternate interface, and to allocate endpoint data in the USB endpoint memory in response to the change and to the USB endpoint memory maps.

In some embodiments an article includes a computer readable medium having instructions thereon which when executed cause a computer to calculate a USB endpoint memory map for a plurality of active endpoints, monitor a change to a configuration, an interface, and/or an alternate interface, and allocate endpoint data in a USB endpoint memory in response to the monitoring and the calculating.

FIG. 1 is a flow diagram 100 illustrating a USB endpoint memory allocation and control implementation according to some embodiments. In some embodiments the USB endpoint memory is an SRAM (Static Random Access Memory). In some embodiments the USB endpoint memory is any type of memory. In some embodiments the USB endpoint memory is included in a USB device. In some embodiments the USB endpoint memory allocation and control is implemented in a USB device controller. In some embodiments the USB endpoint memory allocation and control is implemented within a client device (for example, a USB client device).

Flow 100 starts at 102 with a starting blank USB endpoint memory. A counter A is initialized at 104. Additionally, an endpoint memory starting address is initialized at 104. At 106 a decision is made as to whether the current endpoint is enabled. For example, in some embodiments the endpoint could be one of several physical endpoints in a cell phone device controller having, for example, 23 programmable physical endpoints, each of which can be allocated to have any type of USB connection. If the endpoint is enabled at 106, then a counter B is loaded with the counter A value at 108. This provides a starting point in memory for the current endpoint, since the counter A value is incremented as space in the memory is allocated. At 110 a decision is made as to whether the configuration number of the current endpoint is the same as the configuration number of the endpoint pointed to by counter B and the alternate interface selected for the current endpoint is the same as the alternate interface selected for the interface assigned to the current endpoint. That is, the decision made at 110 is whether the configuration number of the current endpoint is the same as the configuration number of the endpoint already allocated and whether the alternate interface number is the same as the alternate interface selected for the interface assigned to the current endpoint. The first time diamond 110 is encountered for an endpoint the answer to the decision will be "NO". However, after the first time diamond 110 is encountered for an endpoint diamond 110 will determine whether the configuration number of the endpoint that has already been allocated is the same as the configuration number of the current endpoint, and whether the alternate interface selected for the current endpoint is the same as the alternate interface selected for the interface assigned to the current endpoint.

If the determination is made at 110 that the configuration number of the current endpoint is the same as the configuration number of the endpoint B counter and the alternate interface selected for the current endpoint is the same as the alternate interface selected for the interface assigned to the current endpoint, then the endpoint starting address is assigned and the next available address is calculated at 112. The endpoint starting address that is assigned at 112 is a value indicating the end of the memory space that has already been allocated. Since each endpoint needs a certain amount of memory space the next starting address is calculated accordingly. For example, in some embodiments each endpoint might need an amount of space in the range of anywhere from 2 bytes to 2048 bytes. At 114 a decision is made as to whether the next available address is greater than the address space of the endpoint memory (that is, whether the memory address space is exceeded). If a determination is made at 114 that the memory address space is exceeded, then a configuration error indication is provided at 116. In some embodiments, the configuration error signal at 116 may be a visual configuration error provided to a user on a display device, for example. If the determination is made at 114 that the memory address space is not exceeded, then the counter A is incremented at 118. This incrementing of the counter A is an indication that the next endpoint is now being checked.

If the determination is made at 106 that the endpoint is not enabled then the counter A is incremented at 118 so that the next endpoint may be checked. Then a determination is made at 120 as to whether this is the last endpoint (that is, whether any more physical endpoints need to be calculated). If it is not the last endpoint then flow returns to 106. If it is the last endpoint then, in some embodiments, the implementation waits for user input at 122. In some embodiments waiting for user input includes waiting for the user to set a switch to set a memory allocation bit, for example. In some embodiments the endpoints are then switched to their new starting addresses.

If the determination is made at 110 that the configuration number of the current endpoint is not the same as the configuration number of the endpoint pointed to by counter B or the alternate interface selected for the current endpoint is not the same as the alternate interface selected for the interface assigned to the current endpoint, then the counter B is decremented at 124. As discussed above counter A is incremented at 118 to check the next endpoint. Similarly, counter B is decremented at 124 to check the configuration number of the current endpoint and current alternate interface against the next previous configuration number and alternate interface until all previous endpoints have been checked. It is noted that memory spaces will overlap for different endpoints (and/or configurations, interfaces and/or alternate interfaces) because they will not be on (or resident in the endpoint memory) at the same time. After the counter B is decremented at 124, then a determination is made at 126 as to whether or not this is the last endpoint being checked against the current endpoint. If a determination is made at 126 that it is the last endpoint then flow progresses to 118, where the counter A is incremented. If a determination is made at 126 that it is not the last endpoint then flow progresses to 110, where a determination is made as to whether the configuration number of the current endpoint is the same as the configuration number of the endpoint pointed to by counter B and the alternate interface selected for the current endpoint is the same as the alternate interface selected for the interface assigned to the current endpoint.

Figure 2:
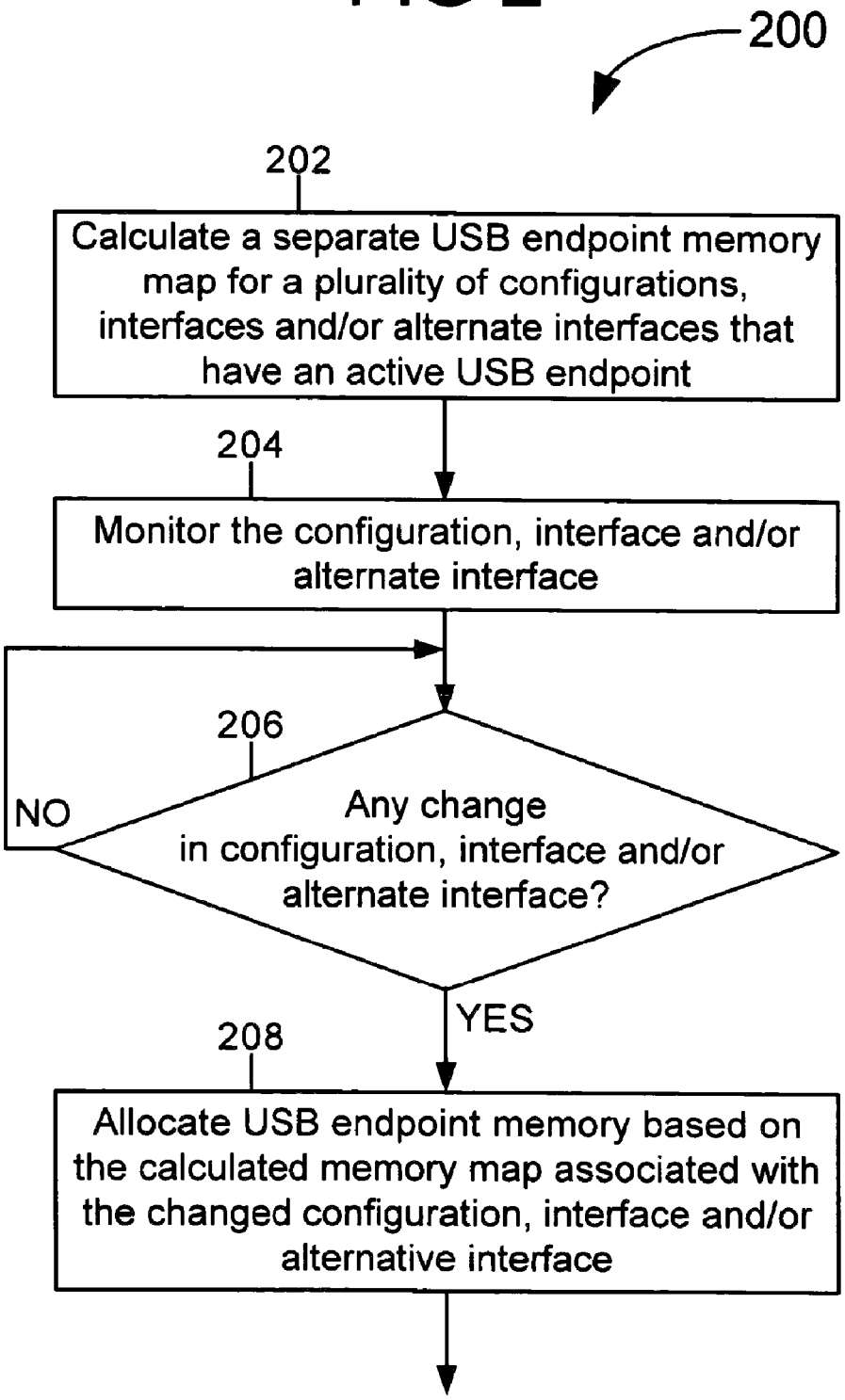
FIG. 2 is a flow diagram illustrating a USB endpoint memory allocation and control implementation according to some embodiments of the inventions.

FIG. 2 is a flow diagram 200 illustrating a USB endpoint memory allocation and control implementation according to some embodiments. In some embodiments flow diagram 200 illustrates a method for allocating and controlling the configuration of memory used to store endpoint data in a USB device that enables the memory space to be reused by many endpoints, thereby reducing the size of memory array required to support the same number of endpoints. In some embodiments the USB endpoint memory is an SRAM (Static Random Access Memory). In some embodiments the USB endpoint memory is any type of memory. In some embodiments the USB endpoint memory is included in a USB device. In some embodiments the USB endpoint memory allocation and control is implemented in a USB device controller. In some embodiments the USB endpoint memory allocation and control is implemented within a client device (for example, a USB client device).

A separate USB endpoint memory map is calculated at 202 for a plurality of configurations, interfaces and/or alternate interfaces that has an active USB endpoint. In some embodiments a memory map is calculated for each configuration, interface and/or alternate interface setting that has an active endpoint. The configuration, interface and/or alternative interface are monitored at 204. In some embodiments the configuration, interface and/or alternate interface activated by a USB host controller are activated at 204. A determination is made at 206 as to whether any change in configuration, interface and/or alternate interface has been made. When the configuration, interface and/or alternate interface are changed, the USB endpoint memory is allocated at 208 based on the changed configuration, interface and/or alternate interface. In some embodiments a user is notified in response to a detected change at 206 and the USB endpoint memory is allocated at 208 based on the calculated memory map for that selection when the allocation is enabled by user input in response to the user notification.

In some embodiments the USB endpoint memory is an SRAM (Static Random Access Memory). In some embodiments the USB endpoint memory is any type of memory. In some embodiments the USB endpoint memory is included in a USB client device.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state, or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:

calculating a USB endpoint memory map for a plurality of active endpoints;

monitoring a change to a configuration, an interface, or an alternate interface activated by a USB host controller;

allocating endpoint data in a USB endpoint memory in response to the monitoring and the calculating.

2. The method according to claim 1, wherein the calculating determines a USB endpoint memory map for each configuration, interface and alternate interface setting that has an active endpoint.

3. The method according to claim 1, further comprising notifying a user when the configuration, interface, or alternate interface are changed.

4. The method according to claim 1, wherein the allocating changes the USB endpoint memory with a calculated memory map corresponding to the change.

5. The method according to claim 1, wherein the allocating changes the USB endpoint memory to store data only for endpoints that are active for the current configuration, interface and alternate interface.

6. The method according to claim 1, wherein the configuration, interface, and alternate interface are selected by a USB host controller.

7. A USB device comprising:

a USB endpoint memory; and a device controller to calculate a USB endpoint memory map for a plurality of active endpoints, to monitor a change to a configuration, an interface, or an alternate interface, activated by a USB host controller and to allocate endpoint data in the USB endpoint memory in response to the change and to the USB endpoint memory maps.

8. The USB device according to claim 7, wherein the device controller is to calculate a USB endpoint memory map for each configuration, interface and alternate interface setting that has an active endpoint.

9. The USB device according to claim 7, wherein the device controller is to notify a user when the configuration, interface, or alternate interface are changed.

10. The USB device according to claim 7, wherein the device controller is to allocate the USB endpoint memory with a calculated memory map corresponding to the change.

11. The USB device according to claim 7, wherein the device controller is to allocate the USB endpoint memory to store data only for endpoints that are active for the current configuration, interface and alternate interface.

12. The USB device according to claim 7, where in the configuration, interface and alternate interface are selected by a USB host controller.

13. A system comprising:

a USB host device;

a USB client device including a USB endpoint memory; and a device controller to calculate a USB endpoint memory map for a plurality of active endpoints, to monitor a change to a configuration, an interface, or an alternate interface, activated by a USB host controller and to allocate endpoint data in the USB endpoint memory in response to the change and to the USB endpoint memory maps.

14. The system according to claim 13, wherein the device controller is to calculate a USB endpoint memory map for each configuration, interface and alternate interface setting that has an active endpoint.

15. The system according to claim 13, wherein the device controller is to notify a user when the configuration, interface, or alternate interface are changed.

16. The system according to claim 13, wherein the device controller is to allocate the USB endpoint memory with a calculated memory map corresponding to the change.

17. The system according to claim 13, wherein the device controller is to allocate the USB endpoint memory to store data only for endpoints that are active for the current configuration, interface and alternate interface.

18. The system according to claim 13, the USB host device further comprising a USB host controller to select the configuration, interface, and alternate interface.

19. The system according to claim 13, wherein the device controller is included in the USB client device.

20. The system according to claim 13, further comprising a USB cable to couple the USB host device to the USB client device.

21. An article comprising:

a *non-transitory* computer readable medium having instructions thereon which when executed cause a computer to:

calculate a USB endpoint memory map for a plurality of active endpoints;

monitor a change to a configuration, an interface, or an alternate interface activated by a USB host controller; *and* allocate endpoint data in a USB endpoint memory in response to [the] monitoring *of the change* and [the] calculating *of the USB endpoint memory map*.

22. The article according to claim 21, the computer readable medium further having instructions thereon which when executed cause a computer to calculate the USB endpoint memory map for each configuration, interface and alternate interface setting that has an active endpoint.

23. The article according to claim 21, the computer readable medium further having instructions thereon which when executed cause a computer to notify a user when the configuration, interface, or alternate interface are changed.

24. The article according to claim 21, the computer readable medium further having instructions thereon which when executed cause a computer to allocate the USB endpoint memory with a calculated memory map corresponding to the change.

25. The article according to claim 21, the computer readable medium further having instructions thereon which when executed cause a computer to allocate the USB endpoint memory to store data only for endpoints that are active for the current configuration, interface and alternate interface.

*26. A computer-implemented method, comprising:*

*receiving, at a host, device configuration data from a connected device;*

*determining, by the host, a resource restriction at the host because of currently connected devices;*

*calculating a memory map for a plurality of endpoints; and*

*allocating resources for the connected device in accordance with the memory map, the device configuration data and the resource restriction at the host.*

*27. The method of claim 26, wherein the device configuration data is selected by a user of the connected device.*

*28. The method of claim 26, wherein the plurality of endpoints are USB endpoints.*

*29. The method of claim 26, wherein the resources include at least one of: bandwidth, power, and endpoint.*

*30. The method of claim 26, wherein the resource restriction is based on bandwidth.*

* * * * *